US007866882B2

United States Patent
Ko et al.

(10) Patent No.: US 7,866,882 B2
(45) Date of Patent: Jan. 11, 2011

(54) STANDARD RADIATION SOURCE

(75) Inventors: Hsin Yi Ko, Taipei (TW); Chun Jen Lin, Hsinchu (TW)

(73) Assignee: Industrial Technology Research Institute, Hsinchu County (TW)

( * ) Notice: Subject to any disclaimer, the term of this patent is extended or adjusted under 35 U.S.C. 154(b) by 377 days.

(21) Appl. No.: 11/941,622

(22) Filed: Nov. 16, 2007

(65) Prior Publication Data

US 2008/0192797 A1 Aug. 14, 2008

(30) Foreign Application Priority Data

Feb. 13, 2007 (TW) ............... 96105197 A

(51) Int. Cl.
*G01K 15/00* (2006.01)
*G01K 19/00* (2006.01)
*G01D 18/00* (2006.01)

(52) U.S. Cl. ............... 374/2; 374/129; 374/208; 374/1

(58) Field of Classification Search ............ 374/1, 374/2, 4, 5, 100, 120, 121, 129, 208; 110/190; 219/520, 543, 553; 250/252.1, 332, 338.1
See application file for complete search history.

(56) References Cited

U.S. PATENT DOCUMENTS

| | | | | |
|---|---|---|---|---|
| 2,785,860 A * | 3/1957 | Harrison et al. | ........... | 236/15 R |
| 3,077,539 A * | 2/1963 | Blau, Jr. et al. | .......... | 250/493.1 |
| 3,091,693 A * | 5/1963 | Rudomanski et al. | ....... | 250/350 |
| 3,138,697 A * | 6/1964 | Banca et al. | ................ | 392/407 |
| 3,216,310 A * | 11/1965 | Gier et al. | ................... | 250/526 |
| 3,348,408 A * | 10/1967 | Engborg | ........................ | 374/2 |
| 3,350,915 A * | 11/1967 | Staffin | .......................... | 374/3 |
| 3,461,290 A * | 8/1969 | Plamondon, Jr et al. | .... | 250/352 |
| 3,487,216 A * | 12/1969 | Haley | ......................... | 250/352 |
| 3,631,708 A * | 1/1972 | Ensor | ............................. | 374/2 |
| 3,731,099 A * | 5/1973 | Greene | ...................... | 250/352 |
| 4,433,924 A * | 2/1984 | Quinn, III | ...................... | 374/2 |
| 4,440,510 A * | 4/1984 | Stein | .......................... | 374/169 |
| 4,599,507 A * | 7/1986 | Hishikari et al. | ............ | 219/486 |
| 6,193,411 B1 * | 2/2001 | Chen | ............................. | 374/2 |

(Continued)

FOREIGN PATENT DOCUMENTS

JP 57131027 A * 8/1982

(Continued)

OTHER PUBLICATIONS

Jian Shen, Zhi Shang Tsuei, A Portable Black Body Furnance With Fixed Middle Temperature Points, Chinese Academic Journal Electronic Publishing House, Aug. 8, 2001,pp. 23-24, vol. 22, Chinese Academic Journal Electronic Publishing House,china.

(Continued)

*Primary Examiner*—Gail Verbitsky
(74) *Attorney, Agent, or Firm*—WPAT, P.C.; Anthony King

(57) ABSTRACT

The present standard radiation source comprises a black body having a cavity, a shielding plate positioned at an open end of the cavity, at least one first heater positioned in the shielding plate, at least one second heater positioned on the outer wall of the black body, a first insulation device covering the second heater and a temperature-controlling device positioned on the first insulation device.

12 Claims, 1 Drawing Sheet

U.S. PATENT DOCUMENTS

| | | | | |
|---|---|---|---|---|
| 6,365,877 | B1 * | 4/2002 | Chen et al. | 219/400 |
| 6,447,160 | B1 * | 9/2002 | Fraden | 374/2 |
| 7,148,450 | B2 * | 12/2006 | Lin et al. | 219/420 |
| 7,148,459 | B2 * | 12/2006 | Williford et al. | 250/207 |
| 7,585,106 | B2 * | 9/2009 | Yamada et al. | 374/2 |
| 2009/0139975 | A1 * | 6/2009 | Wen et al. | 219/400 |

FOREIGN PATENT DOCUMENTS

| JP | 60250223 | A | * | 12/1985 |
|---|---|---|---|---|
| JP | 63138219 | A | * | 6/1988 |
| JP | 01276032 | A | * | 11/1989 |
| JP | 01280227 | A | * | 11/1989 |

OTHER PUBLICATIONS

Kui Ming Goa, Ling Sheng Wang, Li Jie Li, ModerateTemperature Blackbody Furnace with Big Opening and 3-Zone Heating, sum No. 55, pp. 196-201, 1988, vol. 2, Journal of Northeast university of technology.

* cited by examiner

STANDARD RADIATION SOURCE

BACKGROUND OF THE INVENTION (A) Field of the Invention

The present invention relates to a standard source, and more particularly, to a standard radiation source.

(B) Description of the Related Art

All objects with temperature above absolute zero emit radiation, which can be measured by non-contact techniques for evaluating the temperature of the objects. Due to the rapid improvement of non-contact techniques, there are a variety of temperature-measuring devices such as the infrared thermal image apparatus or the radiation thermometer available for providing a safe and convenient temperature measurement. Nowadays, the calibration of the non-contact infra-red ear thermometer generally uses a cavity-shaped black body as the standard radiation source for temperature calibration at several degrees, as required by international standards such as ASTM 1965-98, EN 12470-5:2003, and JIS T 4207:2005. Therefore, how to prepare a radiation black body with high temperature uniformity and high resistance to environmental temperature variations has become a very important issue for non-contact temperature measurement techniques.

To perform temperature calibration at several degrees using a cavity-shaped black body as the standard radiation source, the ear thermometer detects the radiation temperature of the cavity-shaped black body directly. However, the cavity-shaped black body generally uses an open cavity design without isolation from the environment, and the radiation temperature of the cavity-shaped black body is likely to be influenced by the repeated thermal exchange between the cavity and the environment at very high or very low temperature if the temperature variation of the environment is very dramatic. Consequently, the temperature uniformity of the cavity-shaped black body is very poor, which will result in imprecise temperature calibrations for the ear thermometer.

SUMMARY OF THE INVENTION

One aspect of the present invention provides a standard radiation source with high resistance to variations in environmental temperature.

A standard radiation source according to this aspect of the present invention comprises a black body having a cavity, a shielding plate positioned at an open end of the cavity, at least one first heater positioned in the shielding plate, at least one second heater positioned on the outer wall of the black body, a first insulation device covering the second heater and a temperature-controlling device positioned on the first insulation device.

BRIEF DESCRIPTION OF THE DRAWINGS

The objectives and advantages of the present invention will become apparent upon reading the following description and upon reference to the accompanying drawings in which.

DETAILED DESCRIPTION OF THE INVENTION

Figure 1:
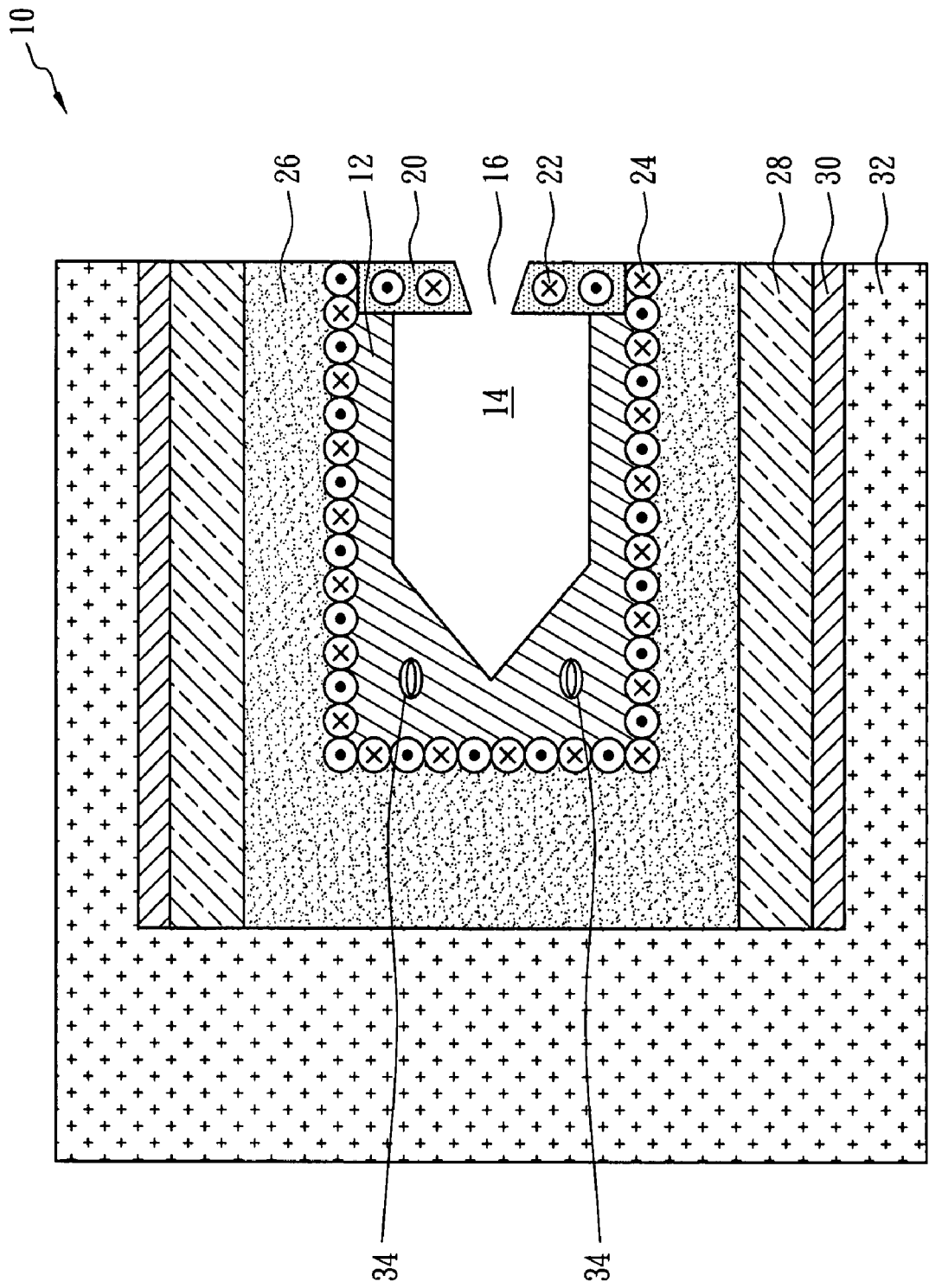
FIG. 1 illustrates a standard radiation source according to one embodiment of the present invention.

FIG. 1 illustrates a standard radiation source 10 according to one embodiment of the present invention. The standard radiation source 10 comprises a black body 12 having a cavity 14, a shielding plate 20 positioned at an open end 16 of the cavity 14, at least one first heater 22 positioned in the shielding plate 20, at least one second heater 24 positioned on the outer wall of the black body 12, a first insulation device 26 covering the second heater 24, an encapsulating metal 28 positioned on the first insulation device 26, a temperature-controlling device 30 positioned on the encapsulating metal 28, a second insulation device 32 encapsulating the temperature-controlling device 30 and a temperature sensor 34 positioned in the black body 12.

To perform the temperature calibration, the ear thermometer inserts the probe head into the cavity 14 via the open end 16 to detect the temperature of the cavity 14. During the calibration process, the first heaters 22 in the shielding plate 20 can promptly heat the shielding plate 20 to prevent the temperature at the open end 16 of the cavity 14 from being influenced by the insertion/pull out of the probe head or outer airflow. In one embodiment of the invention, the thickness of the shielding plate 20 is between 5 and 15 mm, which can keep the temperature at the open end 16 the same as that in the cavity 14, and improve the heat transfer efficiency from the second heaters 24 to the open end 16.

The black body 12 is made of oxygen free copper with high thermal conductivity, which can promptly transfer heat generated by the second heaters 24 to an interface between the cavity 14 and the black body 12 to maintain the temperature of the cavity 14. For example, the heat capacity of the black body 12 is larger than 200 Joules/K, i.e., the radial thickness of the black body 12 is larger than 5 millimeters. The cavity 14 is cylindrical with a radius of about 10 mm, and the cavity 14 has an awl-shaped end, i.e., a tapered end in the black body 12. In one embodiment of the invention, the inner wall of the cavity 14 is a rough surface, coated with black paint or nebulized to decrease the heat emitted to the environment by the internal reflection.

The first insulation device 26 and the second insulation device 32 can be made of ethylene vinyl acetate foam, polyethylene foam or glass fiber. The second heaters 24 are heating wires surrounding the outer wall of the black body 12, and the flow directions of the currents between two adjacent heating wires are opposite. In addition, there are grooves formed on the outer wall of the black body 12, and the heat wires embedded inside the grooves.

The first insulation device 26 can maintain the temperature of the encapsulated interior including the cavity 14 of the black body 12 and the temperature-controlling device 30 such as the thermoelectric cooling module can maintain the temperature of the interior including the cavity 14 of the black body 12 according to preset value. In addition, the second insulation device 32 can prevent thermal exchange between the black body 12 and the external environment to effectively prevent the standard radiation source 10 from being influenced by temperature variations of the external environment so that the temperature of the cavity 14 can be maintained in a predetermined range.

Compared with the prior art, the present invention uses the shielding plate 20, the first insulation device 26 and the temperature-controlling device 30 to dramatically reduce the thermal exchange between the black body 12 and the external environment so as to maintain the temperature of the cavity 14, i.e., resisting the influence of environmental temperature variations to the black body 12. In addition, the first heater 22, the second heater 24 and the temperature-controlling device 30 can maintain the temperature of the cavity 14 according to the preset value. Consequently, the cavity 14 of the black body 12 can provide stable standard radiation temperature in different environments for achieving precise, stable, simple calibration of the ear thermometer.

The above-described embodiments of the present invention are intended to be illustrative only. Numerous alternative embodiments may be devised by those skilled in the art without departing from the scope of the following claims.

What is claimed is:

1. A standard radiation source, comprising:
   a black body having a cavity with an open end, wherein the black body is made of oxygen free copper;
   a shielding plate positioned at the open end and being parallel to a plane of the open end;
   at least one first heater positioned in an interior of the shielding plate;
   at least one second heater positioned on an outer wall of the black body;
   a first insulation device covering and contacting with the second heater;
   a temperature-controlling device positioned on the first insulation device; and
   a second insulation device encapsulating the temperature-controlling device.

2. The standard radiation source of claim 1, wherein the second heaters are heating wires surrounding the outer wall of the black body.

3. The standard radiation source of claim 2, wherein the flow directions of the currents between two adjacent heating wires are opposite.

4. The standard radiation source of claim 2, wherein the black body includes a plurality of grooves at the outer wall, and the heating wires are embedded in the grooves.

5. The standard radiation source of claim 1, wherein the first insulation device is made of ethylene vinyl acetate foam, polyethylene foam or glass fiber.

6. The standard radiation source of claim 1, wherein the inner wall of the cavity is a rough surface.

7. The standard radiation source of claim 1, wherein the inner wall of the cavity is coated with black paint.

8. The standard radiation source of claim 1, wherein the inner wall of the cavity is nebulized.

9. The standard radiation source of claim 1, wherein the temperature-controlling device is a thermoelectric cooling module.

10. The standard radiation source of claim 1, further comprising an encapsulating metal positioned on the first insulation device, and the temperature-controlling device is positioned on the encapsulating metal.

11. The standard radiation source of claim 10, wherein the second insulation device is made of ethylene vinyl acetate foam, polyethylene foam or glass fiber.

12. The standard radiation source of claim 1, further comprising a temperature sensor positioned in the black body.

* * * * *